United States Patent
Lee et al.

(10) Patent No.: US 7,133,263 B2
(45) Date of Patent: Nov. 7, 2006

(54) MAGNETORESISTIVE SENSOR HAVING A SELF ALIGNED LEAD OVERLAY STRUCTURE AND METHOD OF FABRICATION THEREOF

(75) Inventors: Edward Hin Pong Lee, Santa Clara, CA (US); Kim Y. Lee, Fremont, CA (US); Tsann Lin, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 548 days.

(21) Appl. No.: 10/323,339

(22) Filed: Dec. 17, 2002

(65) Prior Publication Data
US 2004/0114282 A1    Jun. 17, 2004

(51) Int. Cl.
*G11B 5/33* (2006.01)
*G11B 5/127* (2006.01)

(52) U.S. Cl. .................................. 360/322; 29/603.01

(58) Field of Classification Search ............. 29/603.01; 360/322
See application file for complete search history.

(56) References Cited

U.S. PATENT DOCUMENTS

| | | | |
|---|---|---|---|
| 5,777,542 A | 7/1998 | Ohsawa et al. | 338/32 R |
| 5,928,715 A * | 7/1999 | Ravipati et al. | 427/130 |
| 6,030,753 A * | 2/2000 | Lin | 430/314 |
| 6,209,193 B1 | 4/2001 | Hsiao | 29/603.15 |
| 6,255,040 B1 | 7/2001 | Sasaki | 430/320 |
| 6,327,116 B1 | 12/2001 | Watanabe et al. | 360/126 |
| 2001/0001256 A1 | 5/2001 | Hsaio | 360/246.6 |
| 2001/0004797 A1 | 6/2001 | Hsaio | 29/603.07 |
| 2003/0137778 A1* | 7/2003 | Kasahara et al. | 360/313 |

* cited by examiner

*Primary Examiner*—David Davis
(74) *Attorney, Agent, or Firm*—Bracewell & Giuliani LLP

(57) ABSTRACT

A self aligned magnetoresistive sensor having a narrow and well defined track width and method of manufacture thereof.

8 Claims, 9 Drawing Sheets

MAGNETORESISTIVE SENSOR HAVING A SELF ALIGNED LEAD OVERLAY STRUCTURE AND METHOD OF FABRICATION THEREOF

BACKGROUND OF THE INVENTION

1. Field of the Invention

The present invention relates to magnetoresistive sensors and more particularly to a lead overlay sensor design that provides for reduced trackwidth size and improved trackwidth control.

2. Description of the Related Art

The present invention relates to commonly assigned application Ser. No. 10/243,271 entitled THIN FILM HEAD READER WITH LEAD OVERLAY AND METHOD OF FABRICATION THEREOF, which is incorporated herein by reference in its entirety.

Digital memory lies at the heart of all computer systems. Magnetic Disk Drives provide this memory function in most modern computer systems, due to their ability to inexpensively store large amounts of data in such a manner that the data can be immediately, randomly retrieved. A magnetic disk drive includes one or more rotating magnetic disks, magnetic write and read heads that are suspended by a suspension arm above the rotating disk and an actuator that swings the suspension arm to place the read and write heads over selected circular tracks on the rotating disk. The read and write heads are directly mounted on a slider that has an air bearing surface (ABS). When the disk rotates, viscous forces in the air cause the air immediately adjacent to the disk to move with the disk. The ABS is aerodynamically configured to allow the slider to fly upon this moving air immediately adjacent to the disk surface.

As the disk moves past the slider, the write head emits magnetic flux pulses in order to imprint a magnetic signal onto the disk. These magnetic signals can then be read by the read head by moving the slider over a desired track and read the magnetic signal as it moves past the read head.

Various magnetic sensors have been used to read data from a magnetic medium. Some prior art disk drives have used anisotropic magnetoresistive (AMR) sensors, while more recently disk drive devices have employed giant magnetoresistive sensors (GMR) also known as spin valves. various other sensors have been proposed as well, such as tunneling magnetoresistive sensors (TMR). At present, GMR sensors are by far the most widely used and as such will be described in more detail herein. A GMR sensor operates on what has been called the "spin valve effect", and includes a non-magnetic conductive spacer material sandwiched between layers of magnetic material. The layer at one side of the spacer material has a magnetic moment that is pinned in a given direction, this layer is generally referred to as the pinned layer. The magnetic material at the other side of the spacer layer has a magnetization that is biased perpendicular to that of the pinned layer, but is free to rotate in the presence of a magnetic field. This layer is generally referred to as the free layer. The selective spin scattering of electrons passing through the sensor causes the electrical resistance of the sensor to change as the angle of the magnetization of the free layer relative to that of the pinned layer changes. In this way, as the sensor moves passed a magnetic field produced by the passing magnetic disk, the angle of the free layer magnetization changes, thereby changing the resistance of the sensor. This change in resistance is detected by passing a sense current through the sensor and detecting the voltage change across the sensor.

The computer industry constantly requires larger memory storage capacity in ever smaller devices. One way to increase data storage efficiency is to reduce the width of a track of data. The reduction of track width allows more tracks of data to be stored on a single disk. One attempt to minimize track width can be more readily understood with reference to FIG. 1 which describes a read sensor 10 having a lead overlay design. The sensor 10 is built upon a gap layer 12, which is an electrically insulating, non-magnetic material. An antiferromagnetic material 14 is formed over the gap layer and is used to fix the magnetization of a magnetically pinned layer 16, in a manner which will be familiar to those skilled in the art. An electrically conductive, non-magnetic spacer layer 18 is formed over the pinned layer, and a magnetically free layer 20 is formed over the spacer layer 18 at the side opposite the pinned layer. Hard bias layers 22 are formed at either side of the sensor 10. The hard bias layers are constructed of a material having a high magnetic moment, which when magnetized acts to bias the magnetization of the free layer in a desired direction due to magnetostatic forces between the hard bias material 24 and the free layer 20. In the lead overlay design described herein, electrical leads 26 are formed over the top of the sensor 10 at portions of the sensor. The leads 26 provide the sense current to the sensor, and as will be appreciate by those skilled in the art, the track width TW of such a design is defined as the distance between the leads. Prior art lead overlay designs and methods of manufacture make accurate track width definitions somewhat difficult as will be described in greater detail below in a discussion of the prior art methods of making such lead overlay sensor.

With continued reference to FIG. 1, the hard bias material 22 tends to slightly overlap the free layer 20, resulting in what has been called a "birds beak" 26. Such a birds beak 26 is undesirable because it tends to pin the overlapped portion of the free layer and makes accurate biasing and track width definition difficult.

With reference to FIGS. 2 through 4 an exemplary method of manufacturing such a lead overlay sensor 10 will be described. With reference to FIG. 2, a layer of sensor materials 28 is formed over the gap material 12. The layer of sensor material could include the various layers making up the sensor 10 as described with reference to FIG. 1 or could be layers making up some other type of sensor such as AMR, TMR etc. A first mask 30, which could be a bi-layer photoresist mask is formed over the sensor layer 28 and is formed of such a width as to define the edges of the sensor. An ion milling process indicated by arrows 32 is used to remove sensor material not protected by the mask 30. This process is generally referred to in the industry as the K2 milling process, or just K2. After the ion milling process 32 has been completed, the hard bias layers 22 are deposited, using the same mask 30 that was used to define the edges of the sensor 10. As can be seen with reference to FIG. 3, this method of construction allows the hard bias layers 22 to slightly overlap the sensor 10. After the hard bias 22 has been deposited, the first mask 30 is removed. The first mask 30 is replaced with a second mask 34, which is narrower than the first mask, and can also be constructed as a bi-layer photoresist structure. As will be seen, this second mask defines the track width dimension. With the second mask 34 in place, the lead material is deposited. As can be seen with reference to FIG. 4, since the second mask 34 is narrower than the first mask 30, the lead material can be deposited directly onto the sensor at side portions of the sensor extending inward from the inner edges of the hard bias material 22. This step of forming the second mask 34 and forming the leads 24 is referred to in the industry as "K5". With the lead layer formed, the second mask layer 34 can be removed and a cap layer (not shown) can be deposited to protect the sensor from subsequent manufacturing process that will be familiar to those skilled in the art.

As will be appreciated from the above, the track width is defined by the second mask 34.

However, as can be seen, this critical photolithographic step is performed on a surface having a severe topography rather than on planar surface as would be desired. This makes accurate photolithography difficult, and as a result makes accurate definition of the track width difficult. In addition, the thickness with which the leads can be deposited is limited, because depositing too much lead material would completely cover the resist structure 34 making it impossible to remove.

From the above it will be appreciated that there remains a need for a magnetic sensor design that provides for very accurate track width definition, while utilizing presently implemented manufacturing techniques. There also remains a need for a lead overlay design, and method of manufacture, that will minimize the effects of hard bias birds beaks.

SUMMARY OF THE INVENTION

The present invention provides a self aligned mangnetoresistive sensor having a well defined track width as well as an extremely symetrical cross section. The sensor of the present invention includes a layer of magnetoresistive sensor material having a central active region and end regions at opposite ends of the sensor. According to the present invention, the end regions have substantially equal lateral widths as viewed from the ABS. The end regions terminate at first and second portions of the sensor. First and second electrically conductive pads are formed on each of the end regions and terminate at the first and second sides. First and second hard bias layers are formed at the first and second sides of the sensor material, and first and second lead layers are formed over at least a portion of the first and second electrically conductive pads, and the first and second hard bias material.

The present invention can be formed by a method wherein, photoresist mask is deposited over a full film of sensor material, the mask being formed with openings to expose regions on the full film material intended to be the end regions of the sensor. An electrically conductive material such as Rh can then be deposited over the mask and sensor layer so as to be deposited on the exposed portions of the sensor material. This can be followed by deposition of a mill resistant material such as for example Ta.

This mask can then be lifted off leaving a full film of sensor material having a pair of electrically conductive lead tabs thereon having a space therebetween. A second photoresist mask is then formed so as to cover a portion of each of the lead tabs and the space therebetween. A Reactive Ion Etch (RIE) or other material removal process is then performed to remove sensor material not covered by the photoresist and the lead tabs. Advantageously, using the lead tabs as a mask to define the width of the sensor allows the sensor to be self aligned. This means that the resulting senor will be extremely symetrical.

Furthermore, the first photolithographic step defines the track width of the invention by defining the width between the laterally opposed lead tabs. Advantageously, this photolithographic step is performed on a planar surface and as such can be performed very accurately, allowing the sensor to be constructed with a smaller, more controllable track-width. Furthermore, the electrically conductive material deposited in conjunction with the first lithographic process can be deposited as a very thin layer. This allows a thinner mask to be used in the first photolithographic step, further facilitating narrower, more controllable track width definition.

After the second photolithographic procedures has defined the sides of the sensor, the sensor could be described as having a flat upper surface terminating at first and second edges with laterally opposed sensor sides extending downwardly from the edges. The sensor sides may be sloped at an angle. The electrically conductive lead tabs formed on the flat upper surface terminate at the first and second edges The space between the lead tabs defines the active region or track width of the sensor, and may be described as the central, active region of the sensor.

Hard bias material layers may be formed to extend from and contact the side of the sensor, and may or may not slightly overlap the thin lead layers. It is an advantage of the present invention, the that the thin lead layers deposited onto the sensor prevent the hard bias material from contacting the flat upper surface of the sensor and thereby limit contact to only the sides of the sensor. Contact between the hard bias layers and the upper surface of the sensor (known in the art as a "birds beak") results in magnetic instability of the sensor, by interfering with the magnetic properties of the free layer of the sensor.

With the hard bias material deposited, another layer of electrical material may be deposited onto at least a portion of the first and second thin lead pads and onto at least a portion of the hard bias material. This second layer of lead material may be significantly thicker than the layer used to form the first and second pads, and is deposited by a photolithographic process resulting in lead portions that contact the electrically conductive pads and extend laterally outwardly from the sensor. It will be appreciated that the photolithographic process used to define the thicker, later applied lead material is much less critical than that of the first two lithographic processes which defined the track width and the sensor width. It is an advantage of the invention that this less critical photolithographic step is conducted on a non-planar surface, while the more critical track width defining photolithography is performed on a planar surface.

Another advantage of the present invention is that by using a thin layer of lead material, the track width defining inner edge of the thin lead pads can be formed with a well defined edge rather than a loosely defined tapered edge.

Those skilled in the art will appreciate the advantage of defining the track width and sensor width in a single photolithographic process on a planar surface. The first photolithographic process defines the inner and outer edges of the lead tabs in a single photolithographic process. As discussed above, the inner edges of the lead pads define the active area of the sensor and therefore define the track-width of the sensor. Since the lead tabs are used as a mask, the outer edges of the leads define the sensor width. It will be appreciated that the present invention allows significant missalignment of the first and second photolithographic processes without affecting the critical dimensions of the senor, as will be discussed in greater detail below.

These and other aspects and advantages of the present invention will be better appreciated upon reading the following description taken together with the accompanying figures.

DETAILED DESCRIPTION OF THE PREFERRED EMBODIMENTS

Figure 5:
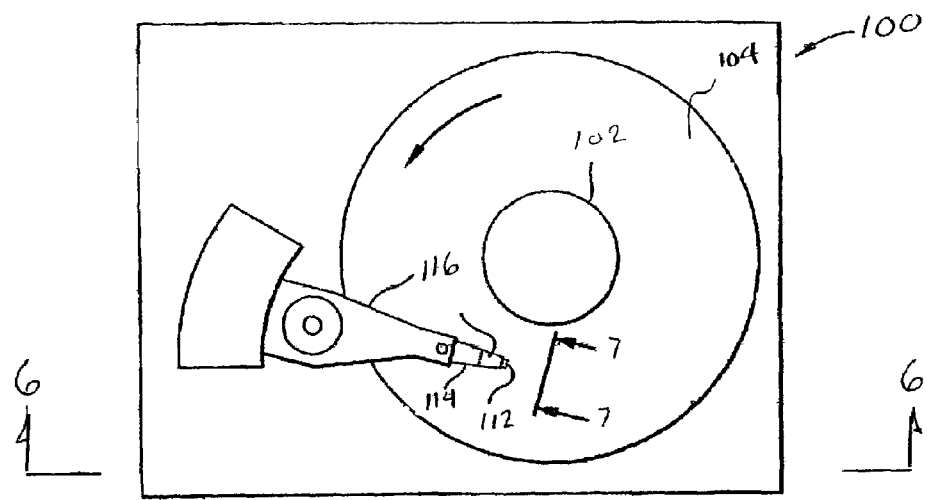
FIG. 5 is a plan view, not to scale, of a disk drive incorporating magnetic head according to the present invention.
Figure 7:
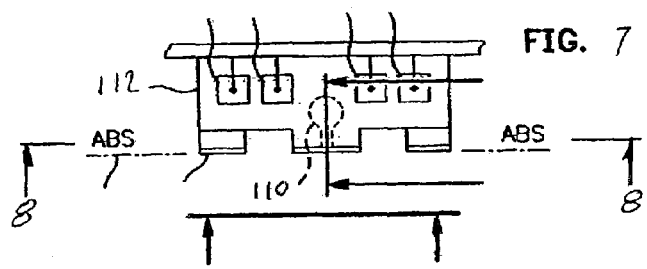
FIG. 7 is an end view of a slider, not to scale, taken along line 7—7 of FIG. 5.
Figure 6:
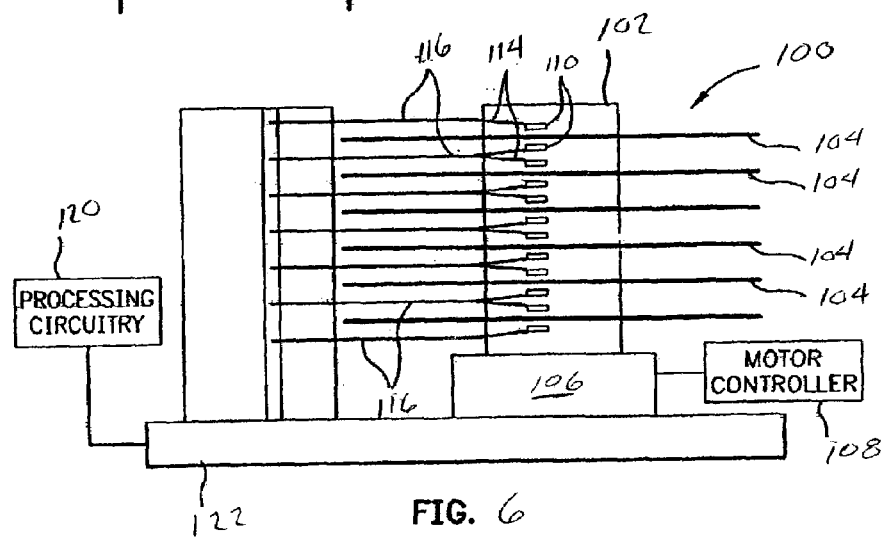
FIG. 6 is a profile view, not to scale, taken along line 6—6 or FIG. 5.

Referring now to the drawings, wherein like reference numerals designate like or similar parts throughout the several views, FIGS. 5–7 illustrate a magnetic disk drive 100. The drive 100 includes a spindle 102 that supports and rotates one or more magnetic disks 104. The spindle 102 is rotated by a motor 106 that is controlled by a motor controller 108. A combined read and write magnetic head 110 is mounted on a slider 112 that is supported by a suspension 114 and actuator arm 116. A plurality of disks, sliders and suspensions may be employed in a large capacity direct access storage device (DASD) as shown in FIG. 6. The suspension 114 and actuator arm 116 position the slider 112 so that the magnetic head 110 is in a transducing relationship with a surface of the magnetic disk 104. When the disk 104 is rotated by the motor 106, the slider is supported on a thin cushion of air (air bearing) between the surface of the disk 104 and an air bearing surface (ABS) 118. The magnetic head 110 may then be employed for writing information to multiple circular tracks on the surface of the disk 104, as well as for reading information therefrom. Processing circuitry 120 exchanges signals representing such information with the head 110, provides motor drive signals for rotating the magnetic disk 104, and provides control signals for moving the slider to various tracks. The various components making up the disk drive can be mounted on or within a chassis 122.

Figure 1:
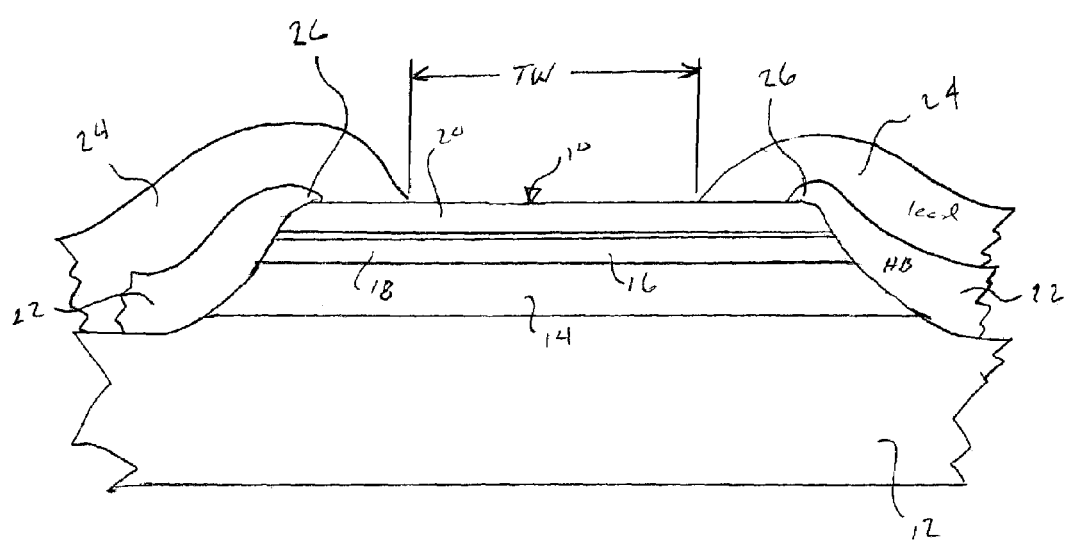
FIG. 1 is a cross sectional view, not to scale, of a prior art lead overlay read sensor.
Figure 2:
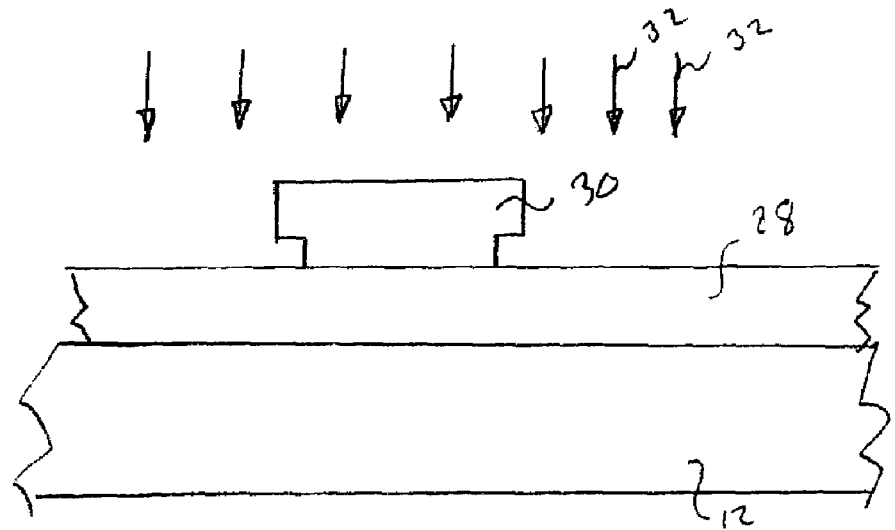
FIG. 2 is a cross sectional view, not to scale of a step in a prior art process of making a read sensor.
Figure 3:
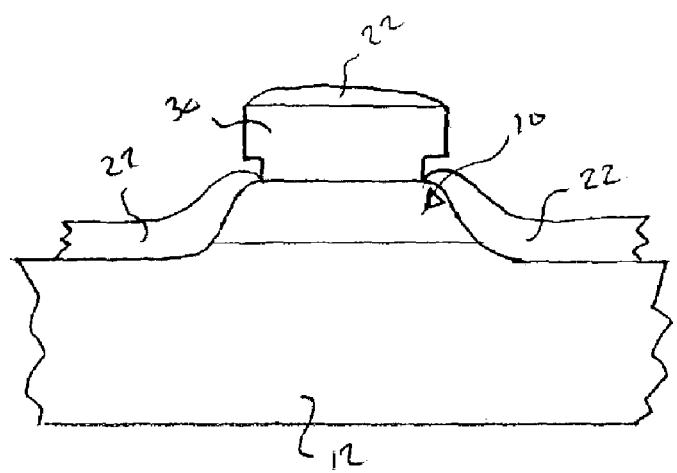
FIG. 3 is a cross sectional view, not to scale of a step in a prior art process of making a read sensor.
Figure 4:
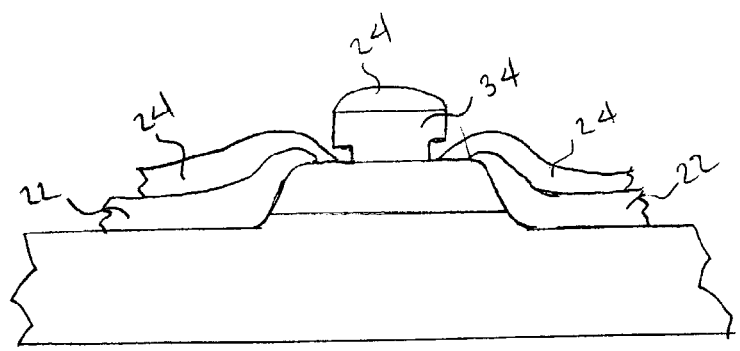
FIG. 4 is a cross sectional view, not to scale of a step in a prior art process of making a read sensor.
Figure 8:
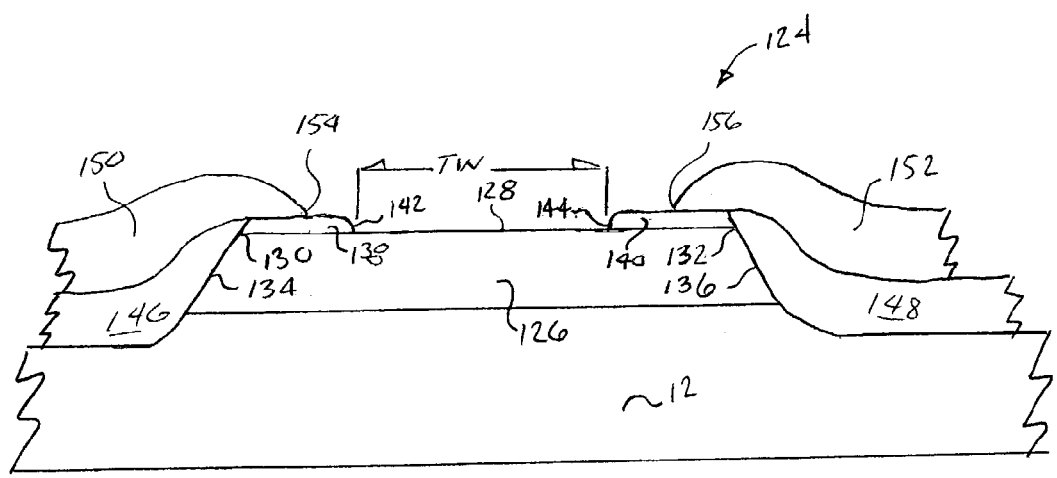
FIG. 8 is a sectional view of a a read head, not to scale and shown enlarged, taken along line 8—8 of FIG. 7.

With reference now to FIG. 8, a cross sectional view, not to scale, as viewed from the ABS is depicted. Those skilled in the art will appreciate that such a magnetic head would also include a write head and first and second shields. However, for purposes of clarity only the read sensor and its associated leads are depicted. The read head includes a magnetoresistive sensor 126, which may be a GMR sensor as described with reference to the background art or could also be some other type of magnetoresistive sensor, such as TMR or AMR. The sensor 126 has a substantially flat surface 128 terminating in first and second laterally opposed edges 130, 132. The sensor 126 also has first and second sides 134, 136, which extend from the edges 130, 132 and slope downward to the substrate supporting the sensor 126. The substrate is preferably a non-magnetic electrically insulting gap layer 12 as described with reference to the background art and will hereafter simply be referred to as the substrate 12. It will be appreciated that while the sides 134, 136 are shown and described as sloping and having portions that are somewhat straight, the sides could also be of other configurations. For example, the sensor 126 could have vertical or nearly vertical side walls or they could also have a serpentine configuration or some other shape when viewed in cross section as in FIG. 8.

With continued reference to FIG. 8, first and second thin lead tabs 138, 140 are formed on the substantially flat surface 128 of the sensor 126. The thin lead tabs 138, 140 extend from inner lead edges 142, 144 to the outer edges 130, 132 of the sensor 126. The distance between the inner edges 142, 144 of the thin lead tabs 138, 140 defines the track width TW of the read head 124. Because the lead tabs 138, 140 are relatively thin, the inner edges 142, 144 can be formed to be well defined and accurately located. While the lead tabs 138, 140 could be, constructed of various electrically conductive materials, they are preferably Rh. Furthermore, the tabs 138, 140 could be of various thicknesses, but are preferably 20–30 nm.

First and second hard bias layers 146, 148, deposited over the substrate 12, extend over the sides 134, 136, and may also extend over a portion of the thin lead tabs 138, 140. With reference to FIG. 8, it will be appreciated that the presence of the thin lead tabs 138, 140 prevents the hard bias layers from contacting the flat surface of 128 of the sensor, ensuring that only the side portions 136, 134 of the sensor 126 contact the hard bias material 146, 148 and eliminating the "birds beak" problem associated with the prior art. First and second electrically conductive leads 150, 152 are formed over the hard bias material, and over a portion of the thin lead tabs 138, 140, and terminate at inner edges 154, 156. Advantageously, the precise location of the inner edges 154, 156 is not critical, however the inner edges 154, 156 somewhere along the top of the thin lead tabs 138, 140, and preferably somewhere near the center of the tabs 138, 140. Like the tabs 138, 140, the leads 146, 148 preferably comprise Rh, although they could be constructed of many electrically conductive materials. The leads 150, 152 could be of various thicknesses, but are preferably 60 to 80 nm, and more preferably are roughly 70 nm thick.

Figure 9:
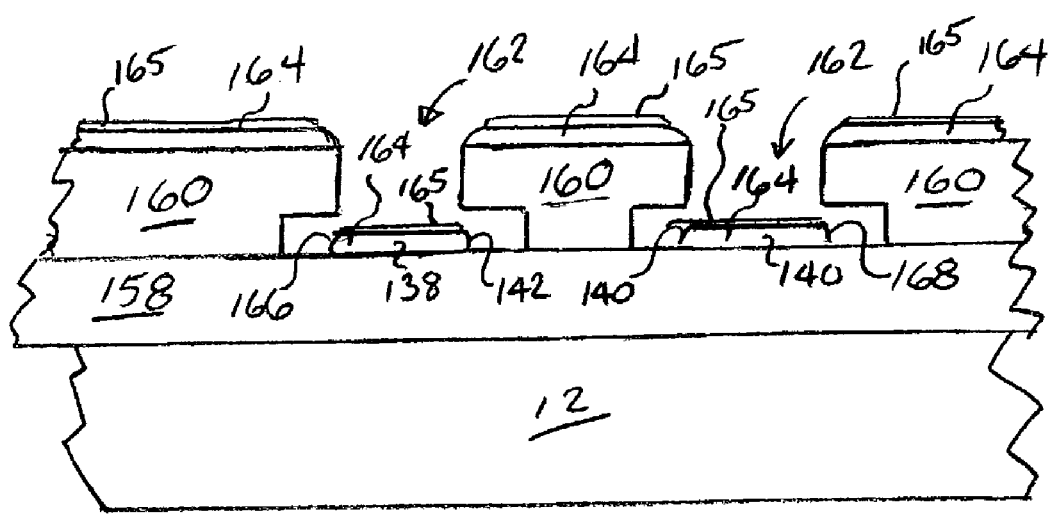
FIG. 9 is a sectional view, not to scale, depicting a step in a process of manufacturing a magnetic head according to the present invention.

With reference now to FIGS. 9 through 13, a method 1300 of manufacturing a read head according to the present invention is described. With particular reference to FIGS. 9 and 14, in a step 1302 a substrate 12 is provided. This can be for example, the electrically insulating, non-magnetic gap layer 12, which can itself be formed upon another substrate, such as silicon. Then, in a step 1304, a full film of magnetoresistive materials 158 is deposited. Those skilled in the art will recognize that the full film of magnetoresistive materials 158 is not a single film layer but actually comprises the various material layers making up a magnetoresistive sensor such as the GMR sensor described with reference to the prior art. The full film magnetoresistive materials 158 could also comprise various material layers making up some other type of magnetoresistive sensor, such as for example an AMR or TMR sensor. After the sensor material 158 has been deposited, in a step 1306 a first photoresist mask 160 is formed having openings 162 formed to define the lead tabs 138, 140 described with reference to FIG. 9. The first photoresist layer 160 is preferably a bi-layer photoresist, which facilitates later lift off of the resist layer, but could also be some other mask, such as for example a single layer photoresist mask or a mask made of a material other than photoresist.

With the first mask 160 in place, in a step 1308, a thin full film layer of electrically conductive material 164 is deposited, preferably by sputtering or some similar method. The electrically conductive material could be for example Rh or could be some other material. Thereafter, in a step 1310, a thin layer of a mill resistant material 165 is deposited. This mill resistant material 165 could be for example, Ta or some other material that is relatively resistant to the material removal process that will be discussed further below. The mask 160 causes the deposited electrically conductive mill resistant materials 164, 165 to define the first and second lead tabs 138, 140. The materials 164, 165 are deposited relatively thin as compared with the major portion of the leads 152 (FIG. 8). This is advantageous in that it prevents sealing off the first photoresist mask 160, allowing a thinner Mask to be used. A thin mask structure provides more accurate definition of the deposited material. The thin profile of the layer 162 allows the lead tabs 138, 140 to be deposited evenly, with relatively abrupt, well defined and accurately located edges inner edges 142, 144 and outer edges 166, 168. Therefore, the thin profile of the layer 162 allows the sensor 124 to be constructed with a narrower, better controlled trackwidth. Another important advantage of the present invention is that the photolithographic, and deposition steps 1406, 1408 that define the edges 142, 144, 166, 168 are performed on a planar surface. Those skilled in the art will recognize such a flat topography significantly improves the accuracy of the photolithographic process used to construct the mask 160, further facilitating the definition of narrower, better controlled tack widths, and symetrical read element 124. After the layer of electrically conductive material 162 has been deposited, in a step 1312, the mask 160 is lifted off using methods familiar to those skilled in the art.

Figure 10:
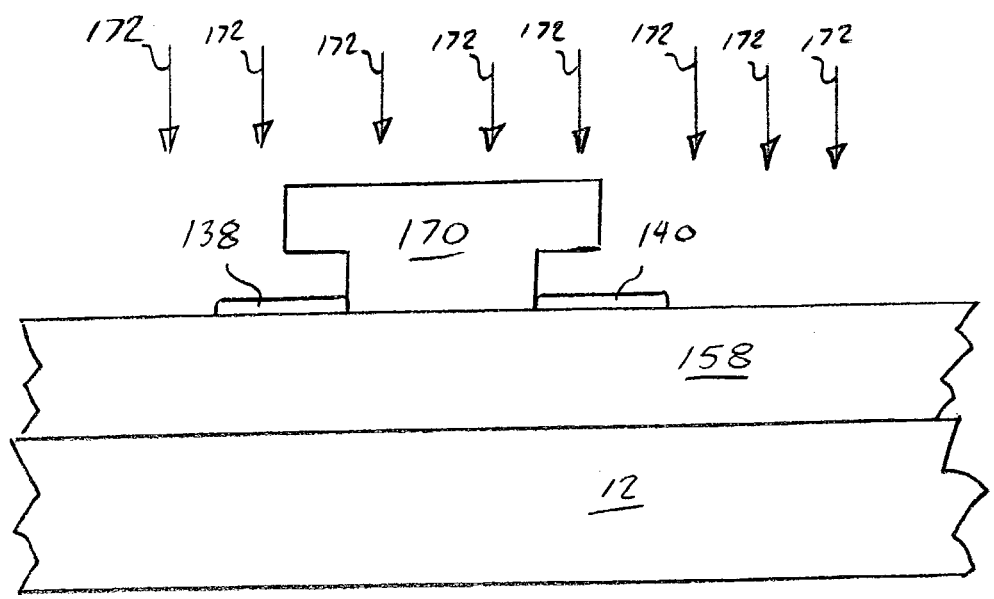
FIG. 10 is a sectional view, not to scale, depicting a step in a process of manufacturing a magnetic head according to the present invention.
Figure 11:
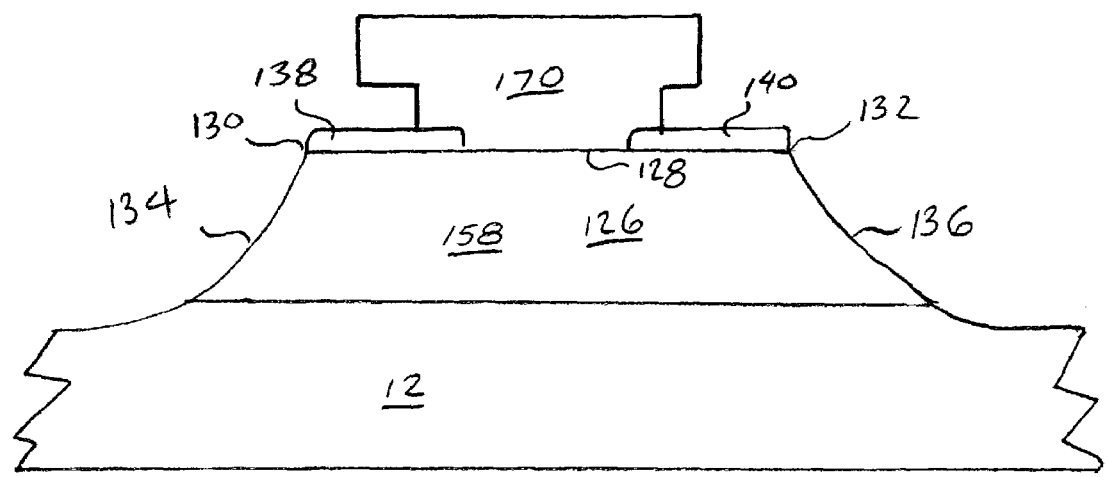
FIG. 11 is a sectional view, not to scale, depicting a step in a process of manufacturing a magnetic head according to the present invention.
Figure 13:
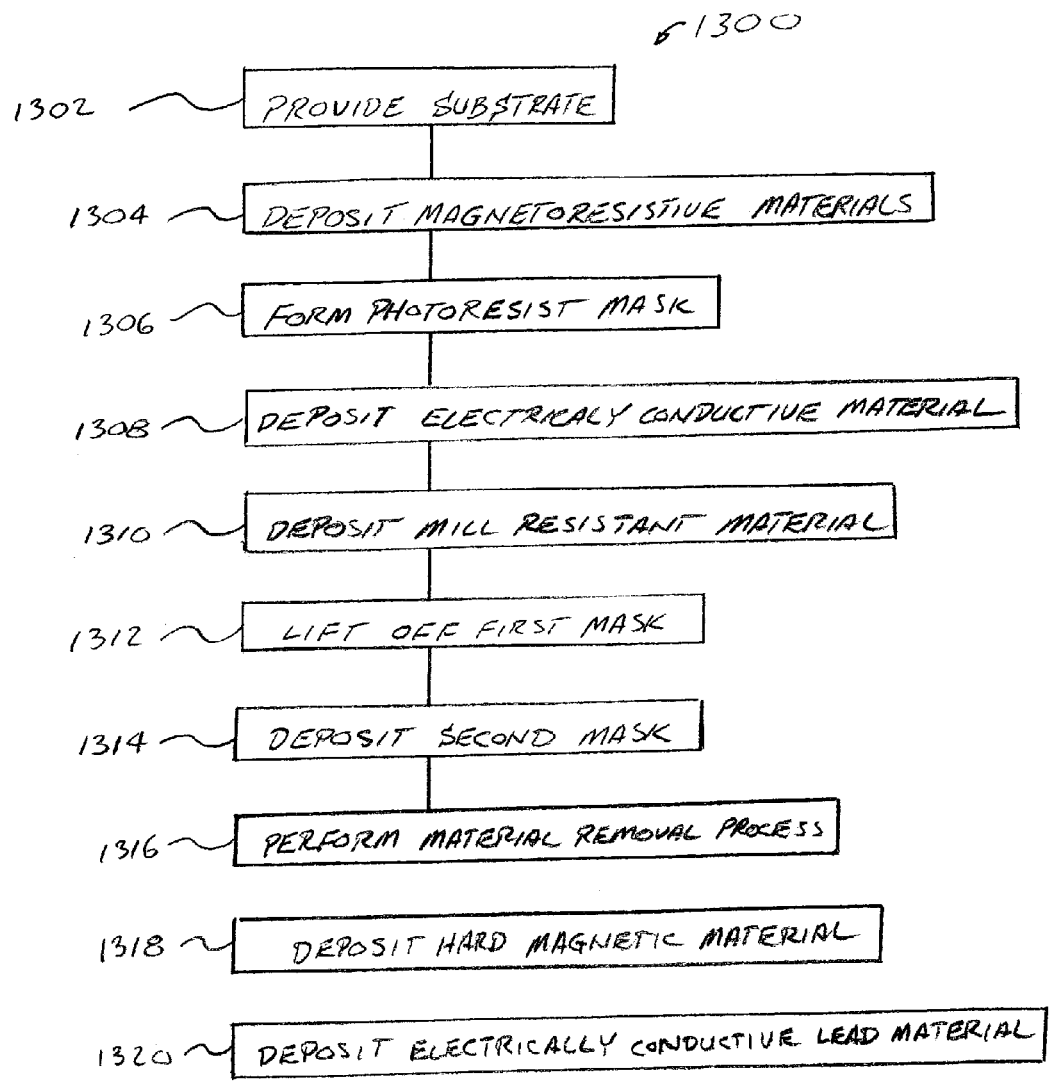
FIG. 13 is a flow chart illustrating steps in method of manufacturing a magnetic head according to the present invention.

With reference now to FIGS. 10 and 13, in a step 1314, a second mask layer 170 is formed. Like the first mask 160, this second mask 170 can be formed as a bi-layer photoresist, by a photolithographic process. This second mask 170 is configured to cover the space between the tabs and covers at least a portion of each of the lead tabs 138, 140. With the mask 170 in place, in a step 1316, a material removal process represented by arrows 172 is performed. This material removal process is preferably an ion milling operation, but could be some other procedure, such as for example reactive ion etching (RIE). During the material removal procedure 1316, that portion of the sensor material 158 not protected by the mask 170 and lead tabs 138, 140 is removed, resulting in a structure as depicted in FIG. 11. It will be appreciated that the the mill resistant material 165 covering the electrically conductive layer 164 of each of the lead pads 138, 140 will prevent the lead pads from being removed by the material removal (milling) operation. The material removal procedure 1316 defines the sensor element 126 from the sensor material layer 158. The formed sensor 126 has a flat upper surface 128 terminating in laterally opposed side edges 130, 132 and having sides 134, 136.

Figure 12:
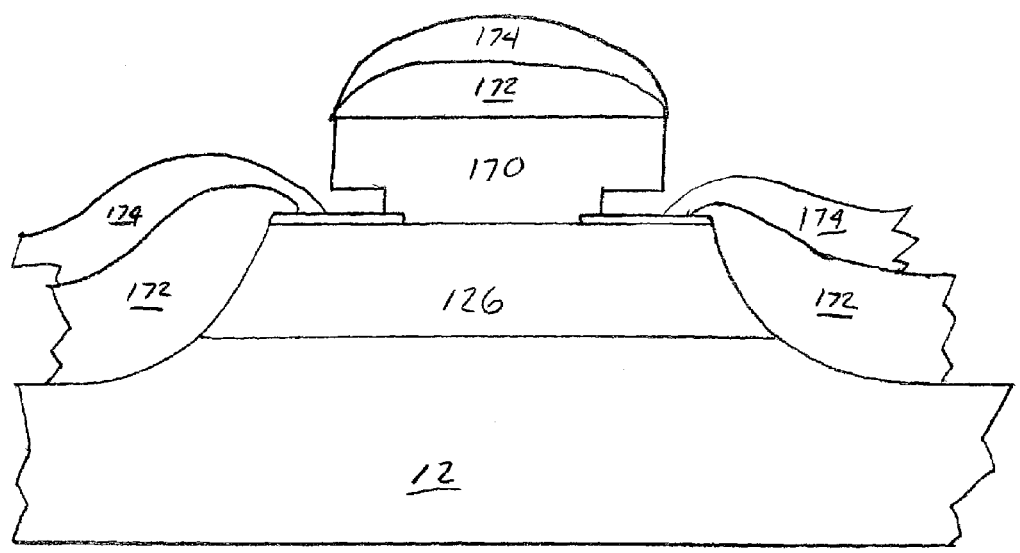
FIG. 12 is a sectional view, not to scale, depicting a step in a process of manufacturing a magnetic head according to the present invention.

With reference now to FIGS. 12 and 13, in a step 1318 with the second mask 170 still in place, a layer of hard magnetic material 172 is deposited. This produces the hard bias layers 146, 148 described earlier with reference to FIG. 8. The deposition of the hard magnetic material 172 is performed relatively vertical or normal to the plane of the wafer (not shown). Then, with continued reference to FIGS. 12 and 14, in a step 1320, an electrically conductive lead material 174 is deposited forming the leads 150, 152 described with reference to FIG. 8. The deposition of the lead material 172 is preferably performed at an angle to the wafer normal on a rotating wafer according to techniques that will be familiar to those skilled in the art. This angled deposition allows the lead material to be deposited further into the undercuts 174, 176 of the bi-layer resist structure 165 such that the deposited material 172 will be in direct electrical contact with the pads 138, 140. Because the deposition process is performed in a sputtering chamber on a rotating platter, the angled deposition will provide even deposition with each of the undercuts 176, 174. Since the track width TW, overall sensor width and sensor symetry have already been defined by the first photolithographic process that produced the lead tabs 138, 140, the precise alignment of the second photolithographic mask 170 is not critical. This advantageous self alignment allows manufacture of a symetrical sensor having a very narrow track width. The self alignment is due to the fact that the track width and sensor edges are defined in a single photolithographic step using a single photolithographic mask.

Various processes can be performed to complete construction of a combination read/write head. Since these processes are familiar to one skilled in the art they are omitted for purposes of clarity. In addition various modifications will become apparent to one skilled in the which would still be contemplated by the present invention. For example, the lead tabs could be constructed by a number of other methods, such as for example a subtractive method wherein lead tab material is deposited as a full film, covered with a mask, and then selectively removed to create the lead tabs 138, 140. Furthermore, the lead tabs could be constructed of several materials and could be constructed of a single material rather than a conductive material covered by a thin mill resistant material. Other embodiments and modification of this invention will no doubt occur to those of ordinary skill in the art in view of these teachings. Therefore, this invention is to be limited only by the following claims, which include all such embodiments and modifications.

What is claimed is:

1. A method of manufacturing a magnetic head, comprising:
   providing a substrate;
   depositing a magnetoresistive material onto said substrate;
   forming planar first and second lead tabs over and on top of portions of said magnetoresistive material, said first and second lead tabs defining a space therebetween;
   said planar forming first and second lead tabs further include depositing a layer of electrically conductive material only on top of said portions of said magnetoresistive material, such that the layer of electrically conductive material is not on top of a hard bias layer
   forming a mask, covering at least a portion of said first and second lead tabs and covering said space between said first and second lead tabs;
   performing a material removal procedure to remove a portion of said magnetoresistive material not covered by said mask or said first and second lead tabs.

2. A method of manufacturing a magnetic head as set forth in claim 1 wherein
said forming first and second lead tabs further comprising:
depositing a layer of electrically conductive material only on top of said portions of said magnetoresistive material, such that the layer of electrically conductive material is not on top of a hard bias layer; and
depositing a layer of material that is relatively resistant to said material removal procedure.

3. A method of manufacturing a magnetic head as set forth in claim 2 wherein said forming first and second lead tabs further comprises:
depositing a layer of Rh;
depositing a layer of Ta over said layer of Rh; and
depositing an electrically conductive lead layer on top of at least portions of the first and second lead tabs.

4. A method of manufacturing a magnetic head as set forth in claim 3 wherein said material removal process comprises ion milling, such that the electrically conductive lead layer forms two leads that extend to approximately a center on the first and second lead tabs, respectively.

5. A method of manufacturing a magnetic head, comprising:
providing a substrate;
forming a magnetoresistive layer having a top flat surface over said substrate;
forming a first mask having first and second openings defining a distance therebetween;
depositing planar lead tab material, a portion of said lead tab material being deposited through said openings on the top flat surface;
said step of depositing lead tabs further include depositing a layer of electrically conductive material only on top of said portions of said magnetoresistive material, such that the layer of electrically conductive material is not on top of a hard bias layer
removing said first mask, leaving said portion of said lead tab material that has been deposited through said openings remaining to form first and second lead tabs on the top flat surface and separated by a space therebetween that extends over the top flat surface;
forming a second mask, said second mask covering said space formed between said first and second lead tabs and covering at least a portion of said first and second lead tabs;
performing a material removal process; and
deposition an electrically conductive lead layer on top of at least portions of the first and second tabs, such that at least other portions of the first and second tabs are not covered by the electrically conductive lead layer.

6. A method of manufacturing a magnetic head as set forth in claim 5 wherein
said step of depositing lead tab material further comprises: depositing a layer of electrically conductive material only on top of said portions of said magnetoresistive material, such that the layer of electrically conductive material is not on top of a hard bias layer; and
depositing a layer of material that is relatively resistant to said material removal procedure.

7. A method of manufacturing a magnetic head as set forth in claim 5 wherein said forming first and second lead tabs further comprises:
depositing a layer of Rh; and
depositing a layer of Ta over said layer of Rh.

8. A method of manufacturing a magnetic head as set forth in claim 5 wherein said material removal process comprises ion milling, such that the electrically conductive lead layer forms two leads that extend to approximately a center on the first and second lead tabs, respectively.

* * * * *